United States Patent
Cunningham, Jr.

[15] 3,700,318

[45] Oct. 24, 1972

[54] FILM GATE

[72] Inventor: Omar Leo Cunningham, Jr., La Jolla, Calif.

[73] Assignee: Stromberg Datagraphix, Inc., San Diego, Calif.

[22] Filed: April 26, 1971

[21] Appl. No.: 137,406

[52] U.S. Cl. ............................... 352/225, 352/227
[51] Int. Cl. ....................................... G03b 1/48
[58] Field of Search....... 352/221, 225, 227, 228, 229

[56] References Cited

UNITED STATES PATENTS

| | | | |
|---|---|---|---|
| 1,966,683 | 7/1934 | Pollock | 352/225 X |
| 1,991,870 | 2/1935 | Schulz | 352/228 |
| 2,834,832 | 5/1958 | Somers | 352/229 X |
| 1,943,366 | 1/1934 | Brown | 352/227 |

FOREIGN PATENTS OR APPLICATIONS 617,843  2/1961  Italy..........................352/227

*Primary Examiner*—Samuel S. Matthews
*Assistant Examiner*—Monroe H. Hayes
*Attorney*—John R. Duncan

[57] ABSTRACT

An improved film gate for motion picture projectors, microfilm viewers and the like is disclosed. The film gate consists essentially of rigid fixed platen and an arcuate spring platen. The platens have cooperating apertures corresponding to the film frame size. During film movement through the film gate the platens are spaced apart to serve as guides. While the film is stopped for viewing, the spring platen presses the film against the fixed platen. The arcuate configuration of the spring platen provides rolling contact as it closes to prevent film damage.

6 Claims, 5 Drawing Figures

Patented Oct. 24, 1972

INVENTOR.
BY OMAR LEO CUNNINGHAM, JR.

ATTORNEY

INVENTOR.
BY OMAR LEO CUNNINGHAM, JR.

ATTORNEY

FILM GATE

BACKGROUND OF THE INVENTION

In motion picture projectors, microfilm viewers and the like, film is moved intermittently through a film gate between the projection light source and the projection lens system. In motion picture systems, the film is stationary for relatively short periods, while in microfilm viewers the film may be held for viewing for variable time periods.

The film gate must not bind or abrade the film during movement, but must firmly hold the film in exact position during viewing to maintain the projected image in focus.

Often the film gate consists simply of a narrow channel through which the film moves. However, if the channel is too narrow, undesirable abrasion and scratching of the film will occur during film movement. If the channel is sufficiently wide to permit free movement of the film, focus of the projected image will vary widely, making viewing difficult and requiring constant refocussing of the projection lens. Generally, the film must be kept within a few ten-thousandths of an inch of the desired plane to provide an acceptably sharp image for viewing.

Various attempts have been made to develop film gates which will clamp the film in the desired plane during viewing and release it for movement. These systems have, however, been subject to several problems.

Where the film is clamped before movement has entirely ceased, or if the film transport attempts to begin film movement before the clamping action is released, damage to the film is likely. While rapid clamping action is desirable, if the action is uneven or the clamping surfaces are irregular, the film may be damaged.

With some film gates, the channel through the gate for film movement does not properly guide the film. If the film "flutters" as it passes through the gate, damage is likely as the film rapidly moves in and out of contact with film gate surfaces.

Many film gates involve complex, relatively heavy, structures having high inertia. Moving the gate between clamped unclamped positions rapidly, with high precision, is difficult.

These problems are becoming more severe as higher speed motion picture projectors are developed. Similarly, microfilm viewers having sophisticated coding systems which permit the rapid selection of frames along a roll of film require very rapid film movement and quick, precise, film clamping. These developments put further burdens on the film gates and gate operating systems. Thus, there is a continuing need for improved film gates for use with high speed film handling devices.

SUMMARY OF THE INVENTION

It is, therefore, an object of this invention to provide a film gate overcoming the above-noted problems.

Another object of this invention is to provide a film gate capable of extremely rapid film clamping and unclamping action.

Still another object of this invention is to provide a film gate of increased simplicity and reliability.

A further object of this invention is to provide a film gate which minimizes film damage during film movement and during clamping and unclamping operations.

The above objects, and others, are accomplished in accordance with this invention by a film gate which comprises a fixed platen and arcuate spring platen, bowed toward the fixed platen. Means are provided to space the spring platen from the fixed platen to guide film for movement therebetween. Clamping means are provided to move the spring platen into rolling, clamping contact with the film and the fixed platen to hold the film securely in a selected plane during viewing.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 2:
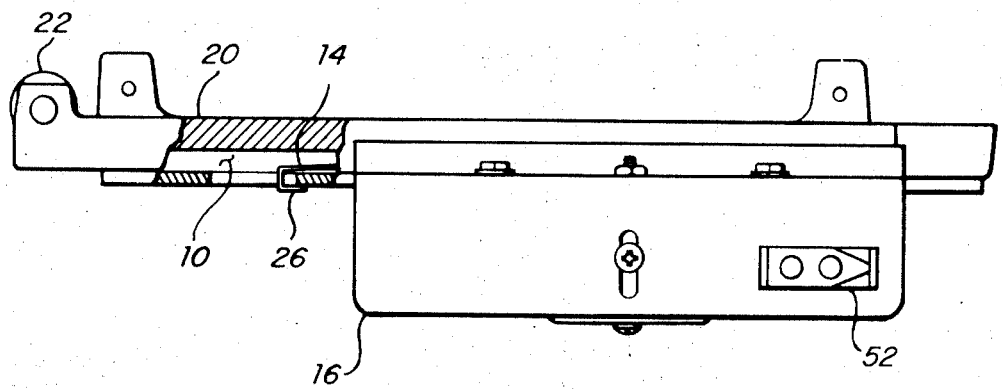
FIG. 2 shows a top view of the film gate, with portions in section.
Figure 1:
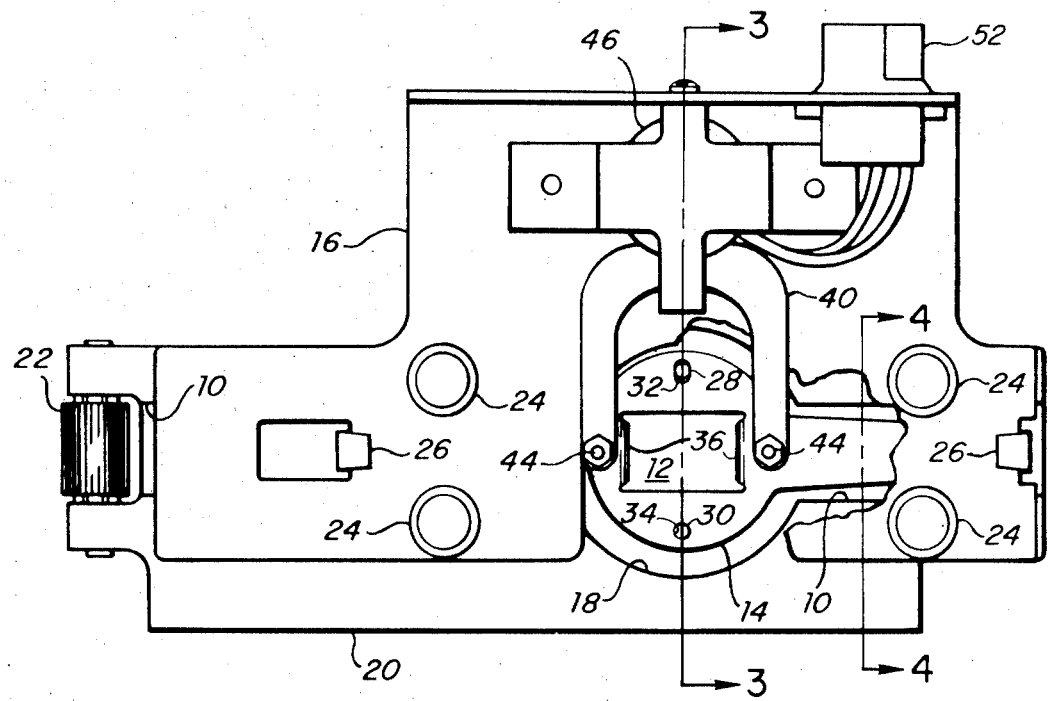
FIG. 1 shows the film gate in front elevation, with portions in section.

Referring now to FIGS. 1 and 2, there is seen a film gate assembly suitable for use in motion picture equipment, microfilm viewers, and other devices in which a strip is fed intermittently past an operating station. The following description of a preferred embodiment will be primarily directed to use of the invention in microfilm viewers. Basically, the film gate assembly comprises a channel 10 (as best seen in the broken-away portion of FIG. 2) of rectangular cross section through which a film strip is passed, a film frame aperture 12 permitting light from a light source (not shown) to pass through the film frame located at aperture 12 and to a projection screen (not shown). Conventional viewer components not essential to the novel film gate, such as the film drive means, the optical system, etc., are not shown for clarity.

During viewing, the film strip is clamped between a movable pressure plate or platen 14 mounted on support member 16 which forms one wall of channel 10 and a fixed platen 18 formed in mounting plate 20 within which channel 10 is formed.

An idler roller 22 guides a film strip into channel 10. Several thumbscrews 24 are provided to hold support members 16 against mounting plate 20. Thumbscrews 24 permit rapid and convenient disassembly and reassembly of the film gate for repair, etc.

Figure 5:
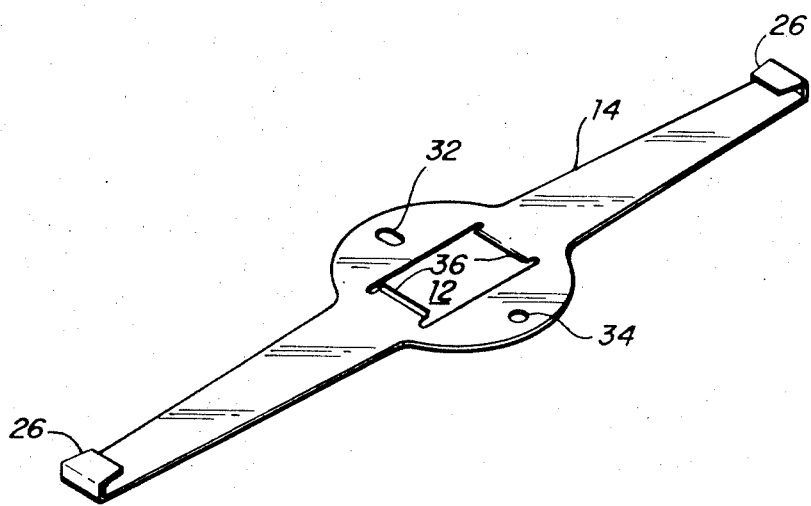
FIG. 5 shows the spring platen portion of the film gate in perspective.

Movable platen 14, as best shown in FIG. 5, is in the form of an elongated thin spring having a film frame aperture 12 at the center and having two reverse-bend mounting portions 26 at the ends. Mounting portions 26 hook over portions of support member 16 to hold the ends adjacent that surface of channel 10, while permitting some lengthwise movement of the ends 26 of platen 14 as the platen is bowed.

The apertured center portion of platen 14 is maintained in the desired position by two guide pins 28 and 30 extending from fixed platen 18. Pins 28 and 30 slidably engage holes 32 and 34, respectively, in movable platen 14. Thus, movable platen 14 is guided during movement toward and away from fixed platen 18.

Edges 36 of the aperture 12 in movable platen 14 are bent back away from the film engaging surface of platen 14. This prevents burrs on these edges from scratching image areas on the film strip as it passes through the film gate.

Movable platen 14 is moved from an "open" position allowing the passage of a moving film strip through the film gate to a "clamping" position which holds the film in a fixed, repeatable position against fixed platen 18 during viewing by means of a solenoid assembly 38.

Figure 3:
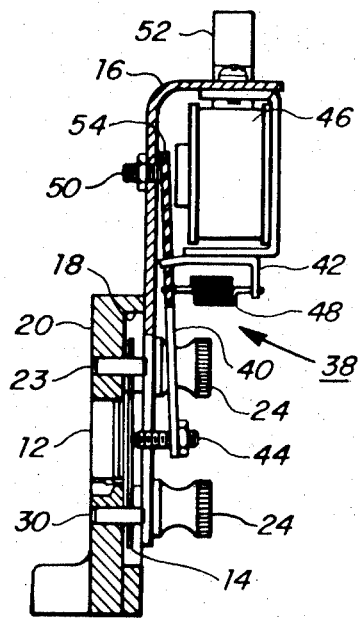
FIG. 3 shows a vertical section through the film gate, taken on line 3—3 in FIG. 1.
Figure 4:
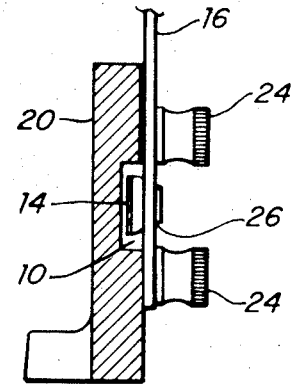
FIG. 4 shows a vertical section through the film gate taken on line 4—4 in FIG. 1.

As best seen in FIGS. 1 and 3, solenoid assembly 38 includes a bifurcated arm 40 pivotable about an edge within a notch in support member 42. Adjustable studs 44 at the ends of arm 40 bear against movable platen 14. When coil 46 of solenoid 38 is de-energized, spring 48 moves studs 44 away from movable platen 14. But, since platen 14 is a thin flat spring members held at ends 26 to support member 16, and platen 14 is bowed by studs 44, platen 14 will move with studs 44 as the spring 14 attempts to regain its original planar configuration. Channel 10 is thus opened for the passage of film therethrough as movable platen 14 moves away from fixed platen 18. The width of the resulting open channel is adjusted by adjusting stud 50. Thus, film moving through the film gate passes from the relatively wide channel 10 at the entrance end of the gate assembly, through the relatively narrow gap between fixed platen 18 and movable platen 14, then out of the gate through the relatively wide channel 10 near the exit from the gate assembly.

While it might be desirable to have a wide inter-platen gap to permit free movement of the film, slightly more time would be required to clamp the film, thus slowing down the clamp-view-unclamp sequence. A relatively narrow gap may be used with the film gate of this invention, since the bowed movable platen 14, forming one wall of channel 10 near aperture 12, provides a smooth transition between the wide channel 10 near the ends of the gate assembly to the narrow inter-platen gap. With the smooth surfaces of the platens, and the smooth channel width transition, damage to the film strip is unlikely.

After the film strip has moved the desired distance, coil 46 is actuated by a signal entering through conventional electrical connector 52. End 54 of arm 40 is rapidly drawn against coil 46, pivoting studs 44 forward, clamping movable platen 14 against fixed platen 18 with the film strip therebetween. Since the distance platen 14 moves is short, and the inertia of platen 14 is very low, the clamping action is very rapid and positive. Since platen 14 is bowed, first contact with the film is at the center, with platen 14 "rolling" into full clamping contact. Thus, should the film have not quite stopped when the clamping action begins, the first contact with the upper and lower film edges (above and below apertures 12, at the center thereof, as seen in FIG. 1) will positively stop the film without risking scratching of the film in image areas, since these edges do not include image information. By the time the edges 36 of platen 14 engage the film in the image area at the forward and rear edges of the frame aperture 12, the film will have been positively stopped.

As is apparent from the above description, the novel film gate and movable plate provide very rapid action, with the film strip accurately held in a consistent plane to assure that focus is uniform for succeeding projected image frames while permitting rapid film movement between frames. Film damage is minimized and reliability is maximized by the simplicity of the film gate assembly and the configuration of the movable platen.

Although specific components and structural arrangements were described in the above description of a preferred embodiment, these may be varied within the scope of the invention. Other variations, ramifications and applications of this invention will occur to those skilled in the art upon reading the present specification. These are intended to be included within the scope of the invention, as defined in the appended claims.

I claim:
1. A film gate comprising:
 a. an elongated channel of generally rectangular cross-section sized to permit a film strip to pass freely therethrough;
 b. a fixed platen forming one side of said channel;
 c. a movable platen forming at least part of the side of said channel opposite to said fixed platen;
 d. corresponding apertures in said platens to permit light to pass from a light source through film in said channel to a projection surface;
 e. said movable platen comprising an elongated bowed spring, with the convex surface toward said channel, said spring biased to move said platen away from said fixed platen; and
 f. clamping means comprising a solenoid to move the convex apertured center portion of said movable platen toward said fixed platen against said spring bias, whereby initial contact with film in said channel is along a line at about the center of said aperture and further clamping occurs in a rolling manner outwardly from that line.

2. The film gate according to claim 1 wherein said movable platen includes two end mounting portions, each adapted to be held at a fixed substantially equal distance from said fixed platen while permitting movement of said end portions toward and away from each other in a plane generally parallel to said channel during movement of the center portion of said movable platen toward and away from said fixed platen.

3. The film gate according to claim 1 further including at least one guide pin extending from said fixed platen through corresponding holes in said movable platen to guide said movable platen during movement toward and away from said fixed platen.

4. In a film gate comprising a channel through which a film strip can be freely moved, a fixed platen and a movable platen forming the walls of said channel parallel to the faces of a film strip positioned therebetween, each of said platens having a light passing aperture corresponding to film frames and closing means to move said movable platen toward said fixed platen to clamp a film strip positioned therebetween; the improvement wherein said movable platen comprises a spring member bowed with the convex side toward said fixed platen and biased away from said fixed platen and said closing means comprises a solenoid adapted to further bow said spring against said biasing force to bring the apertured portion of said movable platen into clamping relationship with said fixed platen, whereby initial contact is along a line at about the center of said aperture and further clamping contact in a rolling manner outwardly from that line.

5. The film gate according to claim 4 wherein said movable platen includes two end mounting portions each adapted to be held at a substantially equal fixed distance from said fixed platen while permitting movement of said end portions toward and away from each other in a plane generally parallel to said channel during movement of the center portion of said movable platen toward and away from said fixed platen.

6. The film gate according to claim 4 wherein said movable platen has at least one guide opening adapted to cooperate with a guide pin on said fixed platen to guide said movable platen during movement thereof toward and away from said fixed platen.

* * * * *